Aug. 23, 1949.   E. STEVENS   2,479,982
SEED POTATO CUTTER
Filed June 24, 1946   3 Sheets-Sheet 2
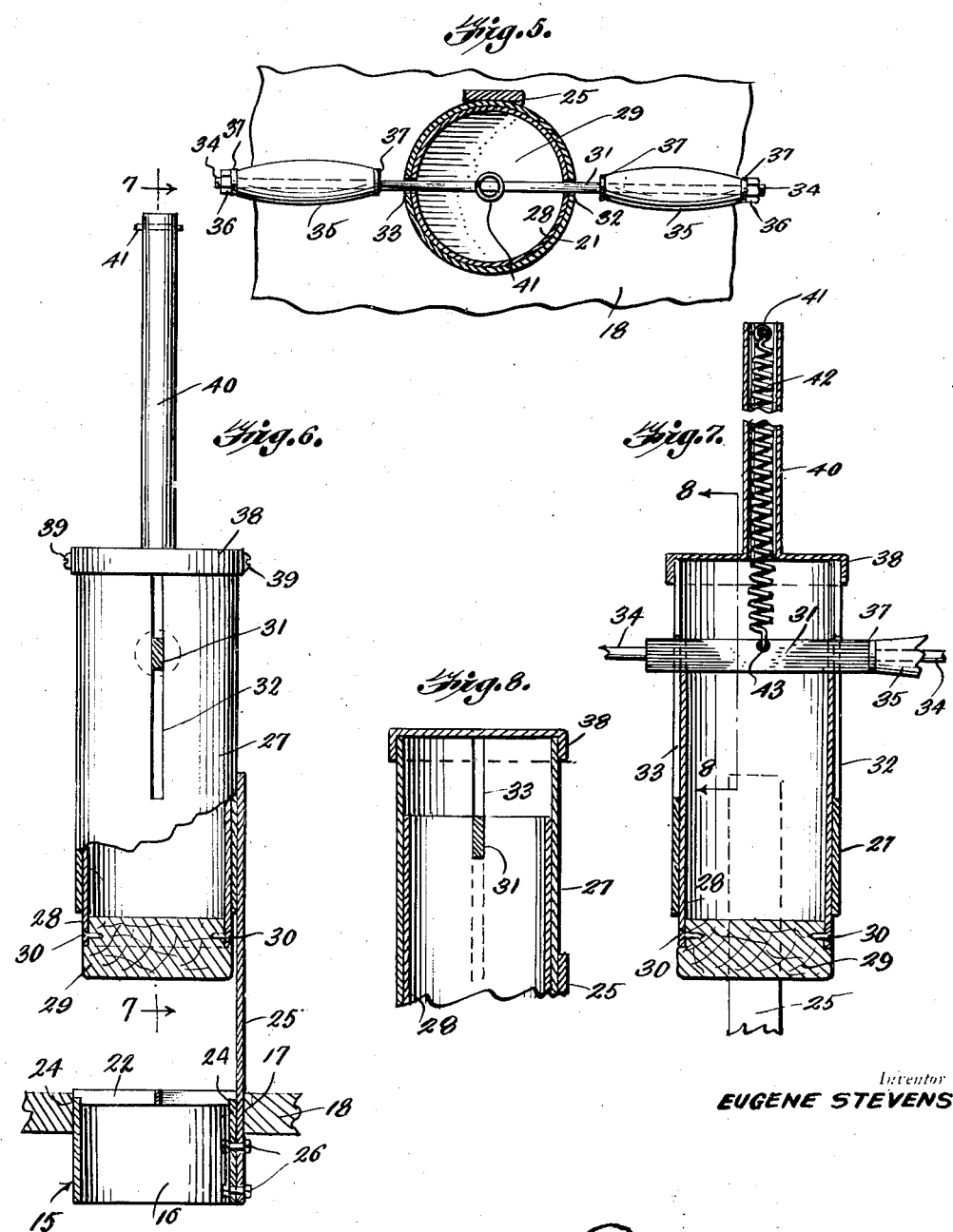
Inventor
EUGENE STEVENS
By Randolph & Beavers
Attorneys

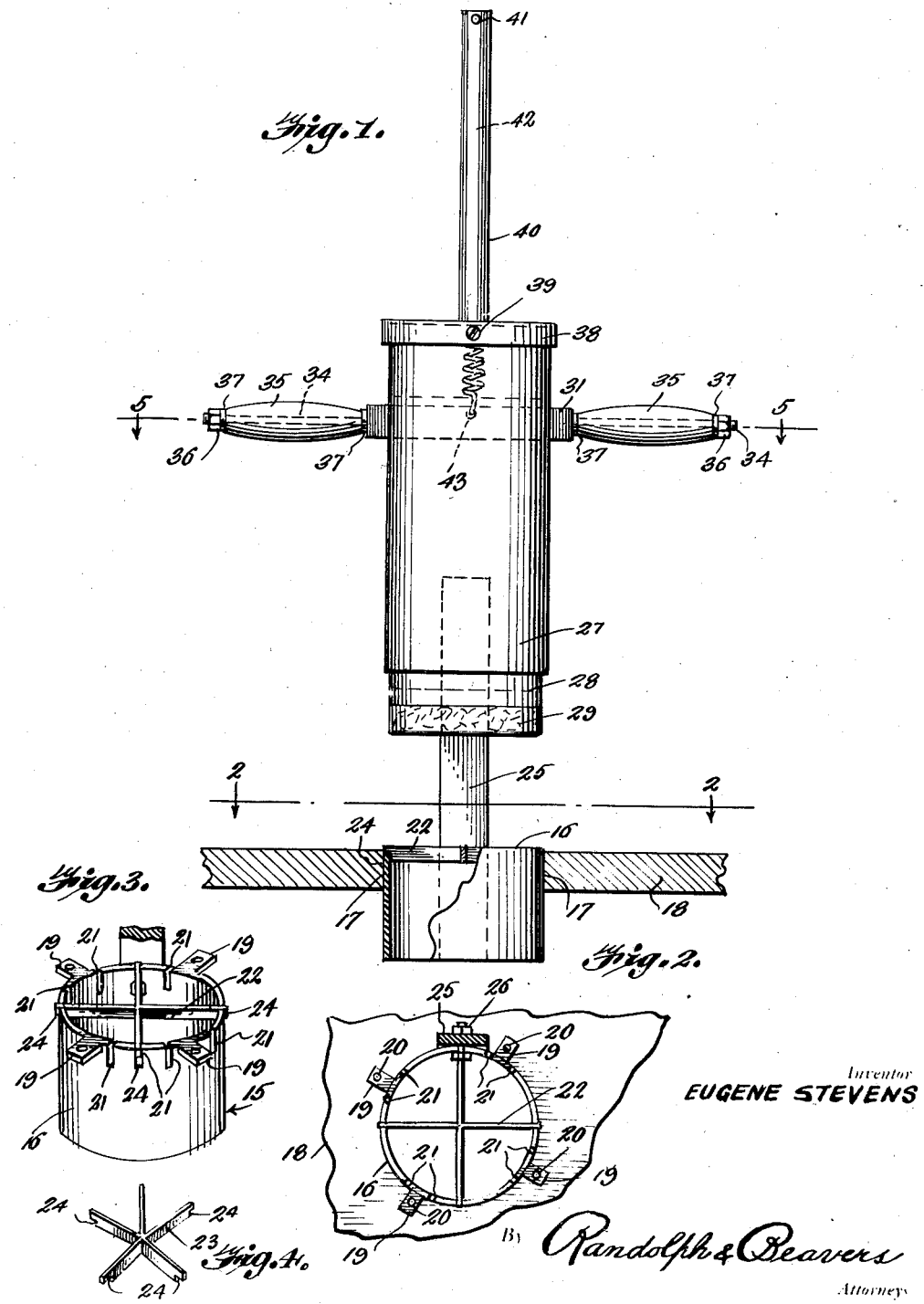

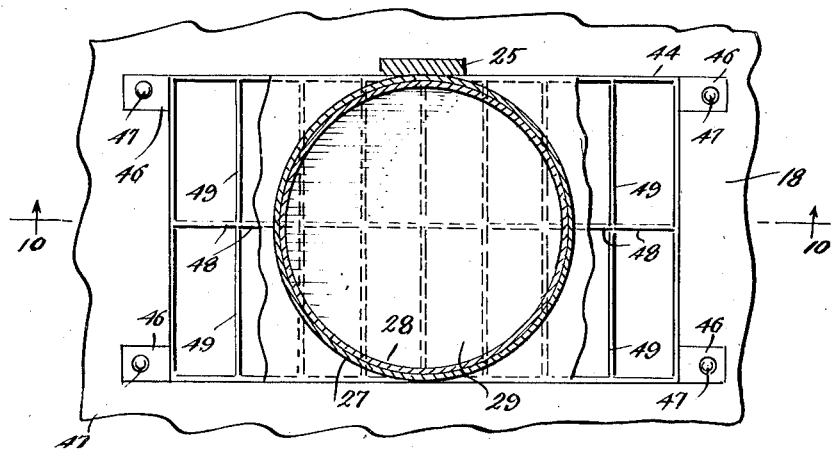
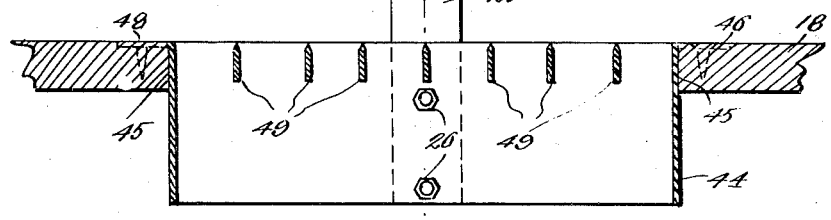
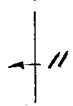
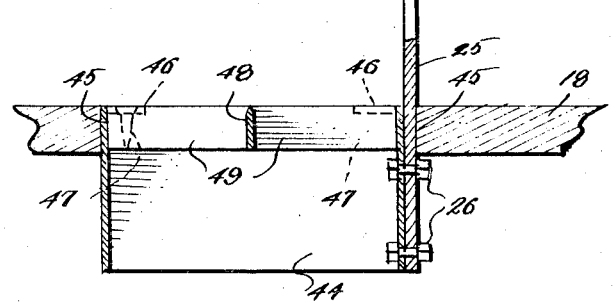
EUGENE STEVENS

Patented Aug. 23, 1949

2,479,982

UNITED STATES PATENT OFFICE 2,479,982

SEED POTATO CUTTER

Eugene Stevens, Carlsbad, N. Mex.

Application June 24, 1946, Serial No. 678,968

1 Claim. (Cl. 146—169)

This invention relates to improvements in seed potato cutting apparatus and devices wherein potatoes of different sizes are adapted to be cut into parts of approximately the same size.

An important object of the present invention resides in the provision of a seed potato cutter of the aforedescribed character in which the potatoes selectively may be forced through a particular one of a plurality of interchangeable cutter units, each having a different number of cutting blades according to the size of the potatoes to be cut thereby and in which the several cutter units may be readily exchanged with a minimum of time and effort.

Another object is to provide a seed potato cutter which conveniently may be mounted in relation to a supporting structure therefor and which may be adaptable for either manual or power operation.

A further object is to provide a seed potato cutter which is rugged and durable, yet extremely simple in construction; which is easy to operate and exceedingly effective and versatile in use; and which is, in addition to the foregoing, economical to manufacture.

Still other objects, features and advantages of the present invention are those relating to the novel combination, construction and arrangement of parts as will become more clearly apparent to those skilled in the art upon a perusal of the following description of the preferred embodiment of the invention, reference being had to the accompanying drawings wherein:

Figure 1 is a front elevation of the seed potato cutter according to the preferred embodiment of the invention, certain parts being broken away to clearly indicate the construction;

Figure 2 is a sectional view taken along the line 2—2 of Figure 1;

Figure 3 is a perspective view of the cutter parts appearing in Figure 2;

Figure 4 is a perspective view of a cutter unit which is interchangeable with the cutter unit illustrated in Figure 3;

Figure 5 is a sectional view taken along the line 5—5 of Figure 1;

Figure 6 is a side elevation of the cutter with certain parts being broken away to illustrate the construction thereof;

Figure 7 is a sectional view taken along the line 7—7 of Figure 6;

Figure 8 is a sectional view taken along the line 8—8 of Figure 7;

Figure 9 is a plan view illustrating the form of cutter assembly employed for cutting long potatoes, certain of the cutter parts associated therewith being shown in sections;

Figure 10 is a sectional view taken along the line 10—10 of Figure 9; and

Figure 11 is a sectional view taken along the line 11—11 of Figure 10.

Referring now to the drawings for a more complete understanding of the invention, and more particularly to Figures 1 through 8 thereof, the numeral 15 generally designates the cutter assembly which is employed for cutting round potatoes.

Cutter assembly 15 comprises a tubular member 16 which is adapted to be received in a circular opening 17 in a supporting structure 18 therefor, such, for example, as a table, bench, etc., the member 16 having a plurality of apertured lugs or tabs 19 adapted to receive suitable screws 20 whereby the member may be secured to the supporting structure.

The top edge of member 16 also is provided with a plurality of slots 21 by means of which the member is adapted to receive in detachable relation therewith any one of a plurality of cutter units, each having a different number of cutting blades. By way of example, two such cutter units are illustrated in the drawings, a cutter unit 22 having four cutting blades being illustrated in Figures 1 to 3 and 6 and a cutter unit 23 having five cutting blades being illustrated in Figure 4. It will be understood, however, that the arrangement of the slots 21 is such that cutter units having two, three, six, seven, eight and other numbers of cutting blades may be as readily used with member 16.

In any case, the ends of the cutting blades of each cutter unit are notched as at 24 so that the cutter units are securely and snugly retained within member 16.

A standard 25 is secured to member 16 as by nuts and bolts 26 and preferably is secured on its upper end to a tubular member 27 as by being welded thereto. A second tubular member 28 is telescopically received into member 27 for axial movement therein, member 28 having inserted in the lower end thereof a wooden or other suitable block 29 which is secured thereto as by screws 30. Member 28 and block 29 together comprise a plunger for forcing a potato interposed between the block and the cutter unit through the cutting blades thereof.

For this purpose, member 28 has secured thereto at the upper end thereof, as by welding, a cross bar 31, the ends of which extend through diametrically opposed slots 32 and 33 formed in member 27, these slots extending to the top of member 27 to facilitate assembly of member 28 and bar 31 therewith and extending a sufficient distance in the opposite direction so as to permit the block to engage the cutter unit.

Each end of crossbar 31 has secured thereto, as by welding, a threaded bolt 34 upon which is mounted a wooden or other suitable handle 35. Each handle is retained on the bolt individual thereto by a unit 36 on the threaded end of the bolt, washers 37 preferably being employed adjacent the ends of the handles to facilitate turning movements thereof.

The upper end of tubular member 27 is closed by a cap 38 which may be secured to member 27 by one or more screws 39. Cap 38 has a tubular member 40 secured thereto, as by welding, and this tubular member carries at the upper end thereof a pin 41 which serves as an anchor for one end of a coil spring 42 which is loosely retained within member 40 and is secured on the other end thereof in an aperture 43 provided therefor in crossbar 31. Coil spring 42 thus serves to yieldably retain the plunger assembly in potato receiving relation with respect to the cutter unit.

Whereas the cutter is disclosed with handles for operating the plunger thereof manually, it will be readily appreciated that the plunger may be driven from a suitable source of power, if desired. For this purpose, an electric motor adapted to drive a crank arm or wheel through a worm drive, for example, and a bifurcated connecting rod interconnecting on one end thereof the crank arm or wheel and interconnecting on the bifurcated end thereof bolts 34, would provide a suitable arrangement for imparting reciprocatory movement to the plunger under control of the motor, the motor preferably being controlled by a switch, in turn, readily controllable by the operator in order to provide instantaneous stopping of the plunger to avoid injury to the operator in feeding the potatoes into the cutter.

Referring now to Figures 9 through 11 wherein a cutter assembly for cutting long potatoes is illustrated, it will be seen that a rectangular box or shell 44 is provided and a suitable aperture 45 is provided therefor in the supporting structure. As in the case of tubular member 16, shell 44 is provided with apertured lugs 46 for receiving suitable screws 47 for securing the shell to the supporting structure, and is secured to standard 25 in the same manner.

Shell 44, however, is provided with a fixed grid of longitudinal and transverse cutting blades 48 and 49 respectively, which are adapted to be cooperatively engaged by a rectangular block 50 which may be secured to block 29 by screws 51.

In the use of the seed potato cutter hereinbefore described and disclosed, the potatoes to be cut may first be assorted into groups according to size and the proper cutter unit selected for each group, this unit being installed in the cutter as the potatoes in the group corresponding thereto are about to be cut. In any case, each potato is interposed between the plunger block and the cutter unit, the operator grasps the handles 35 and applies pressure thereto to force the plunger downwardly against the biasing action of the coil spring 42 whereupon block 29 or 50, as the case may be, forces the potato through the cutting blades. The cut parts of the potato may then fall through tubular member 16 or shell 44, as the case may be, to a suitable container for collecting the potato parts. After the cutting operation, the plunger is restored to its potato receiving position under power of spring 42.

From the foregoing it should now be apparent that a seed potato cutter has been provided which is well adapted to fulfill the aforestated objects of the invention, and whereas certain examples thereof have been disclosed in particularity it is my intention in the appended claim to cover the full range of equivalents commensurate with the spirit and scope of the invention.

What I desire to secure by Letters Patent of the United States is:

In a seed potato cutter of the character disclosed, the combination of a tubular member having means for securing the same to a supporting structure therefor, a cutter unit comprising a plurality of cutting blades disposed within said tubular member and extending laterally thereof, a second tubular member, a standard for securing said first and second tubular members in predetermined spaced relation with respect to each other, a third tubular member telescopically mounted within said second tubular member, a block carried at one end of said third tubular member and engageable with said cutting blades upon movement of the third tubular member within the second tubular member, said second member having a pair of diametrically opposed slots therein, a crossbar carried by said third tubular member and extended outwardly of said second member through said slots therein, a pair of handles secured respectively to opposite ends of said crossbars, a cap on said second tubular member, a fourth tubular member secured on one end thereof to said cap, and a coil spring disposed within said fourth tubular member and secured at one end thereof to the opposite end of the fourth tubular member and secured on the other end thereof to said crossbar.

EUGENE STEVENS.

REFERENCES CITED

The following references are of record in the file of this patent:

UNITED STATES PATENTS

| Number | Name | Date |
| --- | --- | --- |
| 533,189 | Beuttel | Jan. 29, 1895 |
| 563,652 | Bulette | July 7, 1896 |
| 1,588,479 | Lopez | June 15, 1926 |
| 1,879,008 | Anstice | Sept. 27, 1932 |
| 2,046,396 | Matter | July 7, 1936 |